Nov. 3, 1959
M. M. HELLIWELL
2,910,819
HARVESTER REEL
Filed July 3, 1958
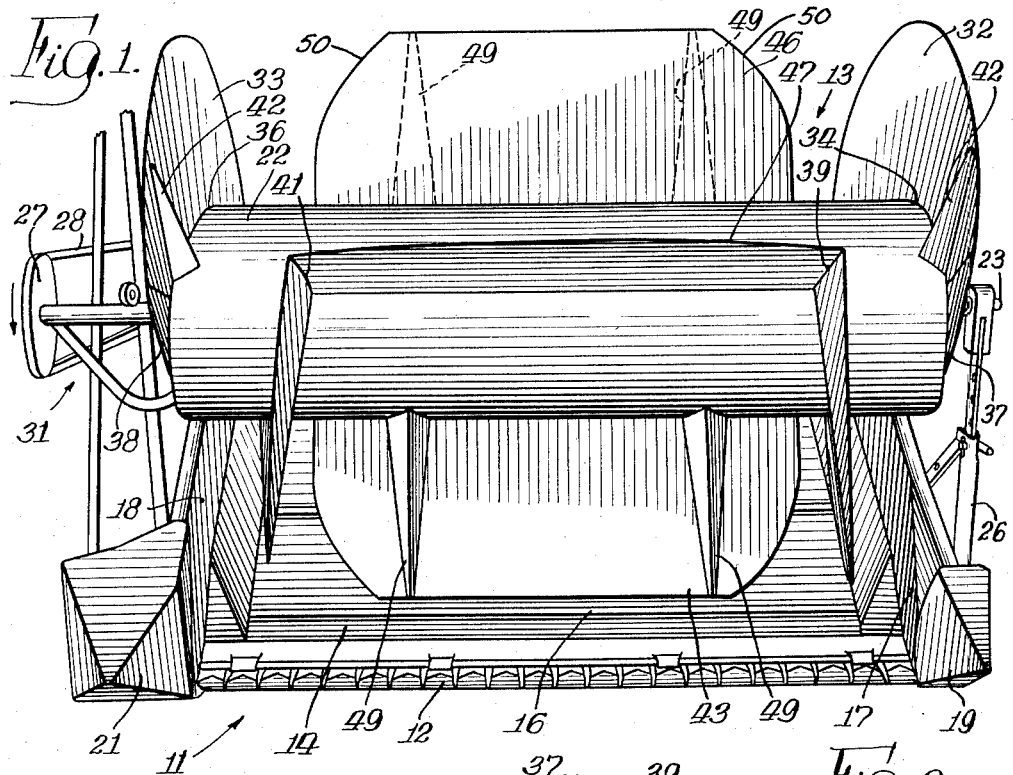
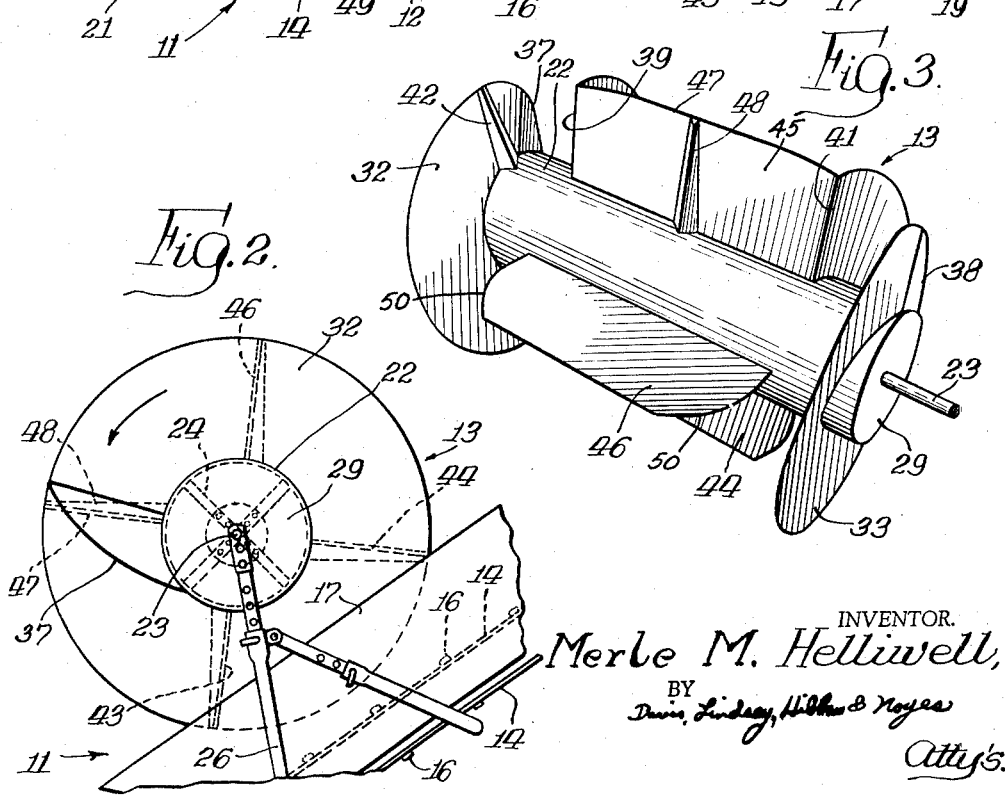
INVENTOR.
Merle M. Helliwell,
BY
Atty's.

United States Patent Office 2,910,819
Patented Nov. 3, 1959

2,910,819
HARVESTER REEL

Merle M. Helliwell, Winchester, Ill.

Application July 3, 1958, Serial No. 746,472
9 Claims. (Cl. 56—202)

This invention relates to harvesting machines and more specifically to a reel for harvesting machines.

General purpose harvesting machines, such as combines and the like, are often intended to be used for harvesting several different types of crops. For example, many well known types of combines are adapted to be readily converted for harvesting and threshing hay crops, such as red top, alfalfa, and lespedeza, grain crops, such as wheat, barley and oats, and vine crops such as beans, peas, and the like. In the case of vine crops, however, although threshing is successfully accomplished, considerable difficulty often is experienced during harvesting due to the tendency of vines to tangle and intertwine. The stems of such crops are long and tough and naturally tangle during growth. During harvesting, vine crops also often become tangled in the machinery of the harvesting machine and machine stoppage results. Thus, much time can be and is lost in the field during harvesting, because of this tendency to tangle.

Many of the commercial forms of harvesting machinery used in this environment have a harvesting platform that includes cutter means, such as a sickle bar cutter or the like, along the front edge of the platform, divider end pieces at the opposite sides of the platform, and a reel for sweeping the crop toward the cutter. The most frequent machine stoppages due to tangling occur because of tangling at this portion of the machinery, particularly at the ends of the reel and along the divider end pieces.

It is a primary object of the present invention to provide a novel reel for use on harvesting machines, the reel being particularly suited for the harvesting of vine crops.

Another object of the invention is to provide a novel reel that prevents and avoids tangling of crops about parts of the machine during harvesting operation.

A further object of the invention is to provide a novel reel that prevents and avoids stoppages due to tangling as aforesaid and that permits faster operation of the harvesting machine during the harvesting of vine crops.

Another object of the invention is to provide a novel reel of the foregoing character which is structurally simple and may be freely substituted for conventional reels on existing machines to better adapt the machines for harvesting vine crops.

Still another object of the invention is to provide a novel reel and divider end piece combination for harvesting machines, in which the reel cooperates with the divider end pieces of the machine to provide a shearing action for severing tangled crops at the end pieces.

Other objects and advantages of the invention will become apparent from the following description taken in conjunction with the accompanying drawing wherein:

Fig. 1 is a front elevational view of a portion of a harvesting machine embodying the present invention;

Fig. 2 is an end view, on a reduced scale, showing part of the structure in Fig. 1 as seen from the right; and Fig. 3 is a further reduced scale perspective view of the reel part of the structure shown in Figs. 1 and 2, as seen from the rear in Fig. 1 or from the right in Fig. 2.

Generally speaking, the objects of the invention are accomplished by providing a novel unitary reel for harvesting machines that comprises a smooth surfaced rotatable drum provided with auger means at each end thereof for moving the crop inwardly along the drum and a plurality of reel sweeps or bats spaced circumferentially around the drum and extending between the auger means for sweeping the crop toward cutter means on the machine. The reel is adapted to be mounted on a harvesting machine in the conventional manner between divider end pieces and above and parallel to cutting means at the front edge of the machine's harvesting platform. The reel also has means that coacts with the divider end pieces for severing tangles of the crop at the end pieces.

Referring to the drawing, Figs. 1 and 2 show portions of the harvesting platform of a conventional harvesting machine modified to embody the present invention. Except for the modifications shown and hereinafter described, the harvesting machine may be conventional and a description of the complete machine is deemed unnecessary for a complete understanding of the invention.

The harvesting platform indicated generally at 11, is one type commonly provided on a number of commercial harvesting machines. The platform functions to carry the crop as it is cut into the body of the machine for processing, such as threshing in a combine. The platform 11 is normally located either at the side or front of the machine and slopes upwardly from front to rear in order to lift the crop into the body of the machine. The front edge of the platform 11 is provided with cutter means, in this instance a sickle bar cutter 12, that cuts the crop as the machine moves forwardly into the crop. The forward movement of the machine and the action of a reel, indicated generally at 13 and discussed more fully hereinafter, causes the crop to fall on the surface of the platform 11 as it is cut by the cutter 12. The surface of the platform 11 is provided with a movable endless belt 14, commonly known as a canvas, having transversely extending, upstanding cleats 16. The canvas 14 and its cleats 16 extend substantially the full width of platform 11, and the canvas is driven by the machine during harvesting so that the crop will be carried thereby upwardly into the machine.

Along the side edges of the canvas 14, the platform 11 is provided with upstanding divider end pieces 17 and 18 for preventing the crop from falling off the sides of the platform. The end pieces 17 and 18 extend rearwardly and slope upwardly along the sides of the platform 11 and are provided with hood-like points 19 and 21 on their forward ends. The points 19 and 21 extend ahead of the sickle bar cutter 12 and divide the crop by forcing the crops to either side of the points 19 and 21 as the points move through the crop to provide a swath of uniform width. As the machine moves through the crop, the points 19 and 21 often become tangled in vine crops, as discussed above.

It is common practice to cut a crop no closer to the ground than is necessary. In combining upstanding wheat, for example, little more than the heads of the top of the crop need be cut. On the other hand, in combining soy beans that have pods substantially the full length of the vine, or "down" wheat and the like, it is necessary to cut the crop close to the ground. Therefore, the height of the platform 11 relative to the ground is adjustable by conventional means not shown. The reel 13 is carried by the platform and moves up and down with the platform 11 as such adjustment is made.

The reel 13 comprises an elongated smooth surfaced rotatable drum having auger devices on its ends for moving the crop inwardly along the drum from the ends thereof, means for sweeping the crop toward the harvester platform, and blade means for severing the crops at the end pieces 17 and 18 in the event tangling occurs at these locations. The reel 13 can be made any conventional size so that it can be freely substituted for conventional reels when vine crops are to be harvested.

Referring particularly to Fig. 3, the reel 13 comprises a cylindrical hollow drum member 22, preferably of sheet metal, to provide a smooth outer surface. A drive shaft 23 is mounted in coaxial relation in the drum member 22 and is held rigidly fixed relative thereto by spider members, such as 24 (see Fig. 2). The ends of the shaft 23 extend beyond the corresponding ends of the drum member 22 for mounting the latter on the machine. One end of the shaft 23 is journaled in a conventional adjustable pillar member 26 located at the right side of the platform 11, as seen in Fig. 1, and the other end of the shaft 23 is also journaled in conventional adjustable structure, indicated at 31, on the other side of the platform. Thus, the position of the reel relative to the platform may be adjusted. A drive pulley 27 is fixed to said other end of the shaft 23 and is connected to the harvester by a belt 28 by which the reel is rotated in a counter-clockwise direction, as seen in Fig. 2. The ends of the drum member 22 are closed by circular end plates 29.

The auger devices provided on the opposite ends of the drum comprise a pair of upstanding helical elements 32 and 33, preferably of sheet metal, and are circular in profile when viewed from the end of the reel. The helical elements 32 and 33 are of opposite hand, the element 32 being a right hand helix and the element 33 being a left hand helix. Also, the elements 32 and 33 are rigidly secured, preferably by welding, by their inner edges, 34 and 36 respectively, to the circumferential surface of the drum member 22 along helical lines thereabout, the lines beginning at the extreme ends of the drum member and advancing approximately one turn axially inwardly along the surface. The pitch of the helix of elements 32 and 33 is not critical, but it should be sufficiently great to cause the crops to be moved inwardly along the surface of the drum member a substantial distance upon one turn of the reel. The helical elements 32 and 33 are rotatively aligned with each other, in this instance, so that their leading edges, 37 and 38 respectively, are aligned and their trailing edges, 39 and 41 respectively, are aligned. The helical elements 32 and 33 are reinforced by sheet metal rib members, such as 42, that extend generally radially from the surface of the drum member along the inner faces of the elements and are welded thereto. The rib members 42 are tapered and generally triangular in cross section. The helical elements flare outwardly slightly as shown.

To overcome tangling that may occur at the divider end pieces 17 and 18, and particularly at the points 19 and 21 thereof, the reel 13 is provided with blade means for severing tangled crops in this area. To this end the leading edges 37 and 38 of the helical elements are curved and blade-like, and are approximately tangential to the surface of the drum member 22 (see edge 37 in Fig. 2). The length of the drum 22 is only slightly less than the distance between the divider end pieces 17 and 18 so that the portions of the elements 32 and 33 immediately behind the edges 37 and 38 are positioned in closely spaced shearing relation to the inner top edges of the end pieces 17 and 18. Thus, any crops tangled thereon are severed thereby upon rotation of the reel in the direction shown.

Between the helical elements 32 and 33, the drum 22 is provided with a plurality of circumferentially spaced sweeps or bats for sweeping the crop ahead of the cutter means toward the cutter means and onto the canvas 14. In the present instance four bats 43, 44, 46 and 47 are provided. The bats 43, 44, 46 and 47 are imperforate sheets, preferably sheet metal, and extend edgewise radially outwardly from the surface of the drum member 22 and are rigidly secured to the drum member 22, as by welding, along lines parallel to the rotative axis of the drum. The ends of the bats 43, 44 and 46 are spaced inwardly from adjacent surfaces of the helical elements 32 and 33 to provide clearance therebetween. The bat 47, however, bridges between the inner ends of the helical elements, the opposite ends of the bat 47 being rigidly secured, preferably by welding, to the trailing edges 39 and 41 of the helical elements for mutual support therebetween. In addition, the bat 47 is reinforced by a radially extending rib member 48 welded to the center of the back surface 45 of the bat 47 and to the surface of the drum member 22. Since the bats 43, 44 and 46 are not otherwise supported at their opposite ends, they are each reinforced by a pair of spaced rib members 49. The rib members 48 and 49 are similar to the rib members 42. The outer corners of the bats 43, 44 and 46 are rounded somewhat, as at 50, to minimize the possibility of crops becoming tangled thereon.

It is apparent from the foregoing and from the drawings that the reel 13 is a substantially unitary structure that has no openings in which a crop can become entangled. By using welded joints instead of other modes of fastening, the possibility of tangling is further reduced. Moreover, there are no spokes or the like, as in conventional reels, that can become entangled with the crop. It should be noted that the radial extent of the bats and the helical elements from the surface of the drum member 22 is approximately equal to the diameter of the drum member 22. Therefore, the diameter of the drum member 22 is approximately one third the maximum cross sectional dimension of the reel and the relatively large diameter of the drum member 22 and its smooth surface prevent the crop from winding around it during harvesting. As the reel rotates, the portions having the blade-like leading edges 37 and 38 cooperate with the divider end pieces to provide a shearing action for severing tangled crops at the end pieces and, thus, keep the points 19 and 21 clear. Also, the augering action of elements 32 and 33 moves the crop inwardly along the surface of the reel and away from the end pieces 17 and 18 and thus prevents tangling at these locations.

As mentioned previously herein, the dimensions of reel 13 can be varied to fit any harvesting machine that has a reel, so that it can be freely substituted where either vine or row crops are to be harvested. Of course, the present reel can be used for harvesting any crop gathered by conventional reel, but the advantages it provides over conventional reels are most apparent when it is used with crops that tend to tangle.

It has been found that in use, the instant invention practically eliminates "down time" in the field during harvesting due to tangling of the crop. In addition, the instant invention permits faster operating speeds of the harvesting machinery during harvesting of crops that tend to tangle and thus promotes better harvesting efficiency and lower operating costs.

Although the invention has been described in connection with a specific structural embodiment, it is to be understood that various modifications and alternative structure may be resorted to without departing from the scope of the invention as defined in the appended claims.

I claim:

1. A reel for a harvesting machine having a harvester platform including transversely extending cutter means for cutting a crop and a pair of divider end pieces at opposite sides of the platform, said reel comprising a cylindrical tubular drum adapted to be rotatably mounted on the machine adjacently above the cutter means and generally parallel thereto between the end pieces and adapted to be rotatively driven in one direction by the machine, a pair of auger devices rigidly secured to said drum on the opposite ends thereof and extending from the surface of the drum outwardly, said devices being of opposite hand for moving the crops inwardly along the drum away from said end pieces upon rotation of the drum in said one direction, and a plurality of circumferentially spaced imperforate reel bats, each rigidly secured by one edge to the surface of said drum between said auger devices for sweeping the crop ahead of the cutter means toward the cutter means upon rotation of said drum in said one direction.

2. A reel according to claim 1 in which each of said auger devices is a helical element having an inner edge secured to the circumferential surface of said drum and a leading edge located at the extremity of its associated end of the drum.

3. A reel according to claim 1 in which each of said auger devices is a helical element extending approximately one turn around said drum.

4. A reel according to claim 1 in which the diameter of said drum is relatively large, being approximately one third the maximum cross sectional dimension of the reel.

5. A reel according to claim 1 in which said auger devices and said reel bats extend from the surface of said drum approximately equal distances radially of said drum.

6. A reel for a harvesting machine having a harvester platform including transversely extending cutter means for cutting a crop and a pair of divider end pieces at opposite sides of the platform, said reel comprising a drum adapted to be rotatably mounted on the machine adjacently above the cutter means and generally parallel thereto between the end pieces and adapted to be rotatively driven in one direction by the machine, means on the opposite ends of said drum member for moving the crop inwardly along said drum away from said end pieces upon rotation of the drum in said one direction, radially extending blade means on the ends of said drum and adapted to cooperate with said end pieces to provide a shearing action therebetween upon rotation of said drum in said one direction for severing crops tangled at said end pieces, and means carried by said drum for sweeping the crop ahead of the cutter means toward the cutter means upon rotation of said drum in said one direction.

7. A reel for a harvesting machine having a harvester platform including transversely extending cutter means for cutting a crop and a pair of divider end pieces at opposite sides of the platform, said reel comprising a drum adapted to be rotatably mounted on the machine adjacent the cutter means and generally parallel thereto between the end pieces and adapted to be rotatively driven in one direction by the machine, a pair of helical elements rigidly mounted on opposite ends of said drum, said helical elements being of opposite hand to advance the crop inwardly along said drum away from the end pieces upon rotation of said drum in said one direction, each of said helical elements having a radially extending portion providing a blade-like leading edge located at the extremity of its associated end of said drum and adapted to cooperate with its adjacent end piece to provide a shearing action upon rotation of said drum in said one direction for severing crops tangled at said end pieces, and means carried by said drum for sweeping the crop toward the cutter means upon rotation of said drum in said one direction.

8. A reel for a harvesting machine having a harvester platform including transversely extending cutter means for cutting a crop and a pair of divider end pieces at opposite sides of the platform, said reel comprising a drum adapted to be rotatably mounted on the machine adjacent the cutter means and generally parallel thereto between the end pieces and adapted to be rotatively driven in one direction by the machine, a pair of helical elements rigidly mounted on opposite ends of said drum, said helical elements being of opposite hand to advance the crop inwardly along said drum away from the end pieces upon rotation of said drum in said one direction, each of said helical elements having a leading edge located at the extremity of its associated end of said drum and a trailing edge located inwardly along the drum from the extremity of its associated end, and a plurality of circumferentially spaced reel bats rigidly secured to the drum between said spiral elements for sweeping the crop toward the cutter means upon rotation of said drum in said one direction, each of said helical elements being connected at its trailing edge to the adjacent end of one of said bats to provide support for said helical elements.

9. A reel according to claim 8 in which the length of said drum member is approximately equal to the distance between the end pieces and in which said leading edges are blade-like to sever crops tangled at the end pieces by a shearing action upon rotation of said drum in said one direction.

References Cited in the file of this patent

UNITED STATES PATENTS

| | | |
|---|---|---|
| 2,152,920 | Ristau | Apr. 4, 1939 |
| 2,403,271 | Erickson | July 2, 1946 |
| 2,755,912 | Ashton | July 24, 1956 |